April 24, 1928.

G. M. JOHNSTON

FISH FLAKE

Filed Oct. 19, 1926

1,667,553

Inventor
George M. Johnstone
By Attorneys
Southgate Fay + Hawley

Patented Apr. 24, 1928.

1,667,553

UNITED STATES PATENT OFFICE.

GEORGE M. JOHNSTON, OF CLINTON, MASSACHUSETTS, ASSIGNOR TO WICKWIRE SPENCER STEEL COMPANY, OF NEW YORK, N. Y., A CORPORATION OF DELAWARE.

FISH FLAKE.

Application filed October 19, 1926. Serial No. 142,727.

This invention relates to fish flakes or frames on which fish are spread for drying. It is the general object of my invention to provide an improved construction of fish flake, possessing manifest advantages over the flakes or frames now in common use.

A further object is to provide a fish flake which is substantially non-corrosive and which will not be readily affected by the action of salt water, and also to provide a fish flake which may be easily cleaned and which will be strong and durable in use.

In the carrying out of my invention, I preferably provide a fish flake formed from a single piece of non-corrosive sheet metal, such as sheet zinc, and I provide a stiffened edge portion therefor preferably formed integrally with the perforated center portion or grid and also preferably grooved or corrugated lengthwise to increase the stiffness of the flake or frame.

My invention further relates to arrangements and combinations of parts which will be hereinafter described and more particularly pointed out in the appended claims.

Figure 1:
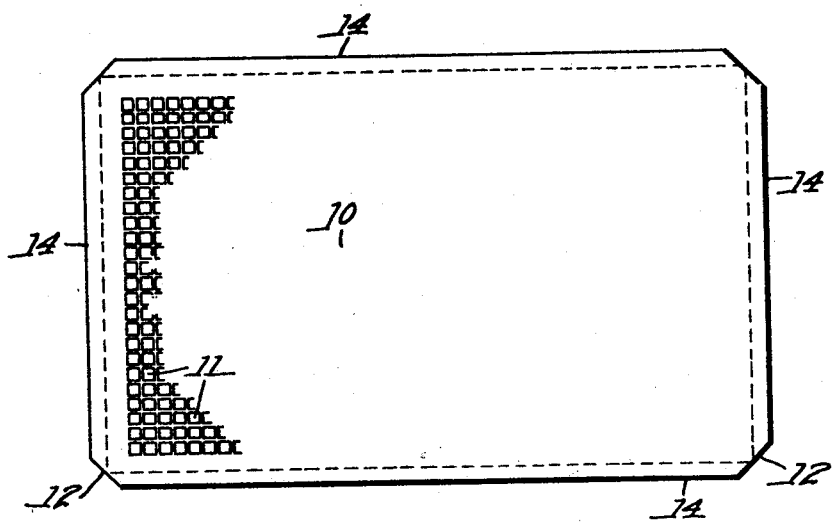
Figure 2:
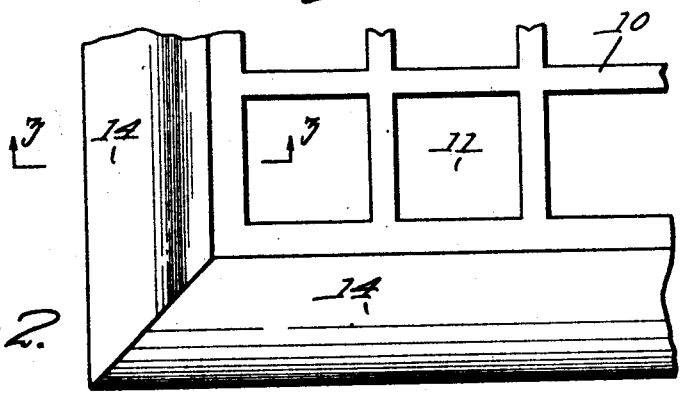
Figure 3:
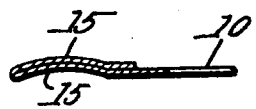

A preferred form of my improved fish flake is shown in the accompanying drawings in which Fig. 1 is a plan view of a blank from which my improved flake may be formed;

Fig. 2 is a fragmentary, full-size plan view of one corner of the finished flake; and Fig. 3 is a detail sectional view taken along the line 3—3 in Fig. 2.

Referring to the drawings, I preferably form my improved fish flake from a single piece of non-corrosive sheet metal, having the center portion 10 perforated by a great number of closely adjacent openings 11, so as to provide a grid or foraminous portion to support the fish and to permit easy access of air thereto. The edge portion of the blank is left unperforated and the corners are preferably bevelled, as indicated at 12, for convenience in folding.

After the portion 10 has been perforated and the corners have been beveled, as indicated in Fig. 1, the edge portions 14 are folded over against the body portion 10, as indicated in Fig. 2, thus providing an edge frame of double thickness.

The stiffness of the frame may be thereafter substantially increased by grooving or corrugating the edge portions 14 lengthwise, as indicated at 15 in Fig. 3. When thus grooved or corrugated, the stiffness of the edges is much increased.

Fish flakes constructed as above described have been found extremely satisfactory in use, and have been also found to possess greatly increased strength and durability. The flat perforated surface of the flake affords much less chance for the lodging of dirt or refuse thereon, and the flakes are much more easily kept clean and sanitary.

While I have indicated sheet zinc as a desirable material, my invention is not necessarily limited thereto, as heavily galvanized iron or steel, or other suitable materials may be substitutes therefor.

Having thus described my invention and the advantages thereof, I do not wish to be limited to the details herein disclosed otherwise than as set forth in the claims, but

What I claim is:

1. A fish flake comprising a single piece of perforated non-corrosive sheet metal having the integral edge portions thereof folded over against the body portion thereof and in close engagement therewith, and corrugated lengthwise to stiffen said flake.

2. A fish flake formed of a single non-corrosive sheet metal blank having a great number of openings formed in its center body portion to provide a foraminous drying surface, and having its edge portions folded closely against the adjacent body portion and said body portion and said folded edge portions having associated corrugations extending lengthwise around said flake and effective to stiffen the structure thereof.

In testimony whereof I have hereunto affixed my signature.

GEORGE M. JOHNSTON.